(12) United States Patent
Herwig et al.

(10) Patent No.: US 7,264,167 B2
(45) Date of Patent: Sep. 4, 2007

(54) OPTICAL SCANNER HAVING MICRO-ELECTRO-MECHANICAL SYSTEMS MIRROR ARRAY AND ASSOCIATED METHOD

(75) Inventors: Nathaniel Christopher Herwig, Lawrenceville, GA (US); Sik Piu Kwan, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/000,021

(22) Filed: Nov. 30, 2004

(65) Prior Publication Data

US 2006/0113393 A1    Jun. 1, 2006

(51) Int. Cl.
*G06K 7/10* (2006.01)
(52) U.S. Cl. .................. 235/462.23; 235/454
(58) Field of Classification Search ................
235/462.01–462.49, 454, 472.01–472.03
See application file for complete search history.

(56) References Cited

U.S. PATENT DOCUMENTS

| | | | | |
|---|---|---|---|---|
| 5,115,122 A | * | 5/1992 | Jwo et al. ................ | 235/462.4 |
| 6,155,490 A | * | 12/2000 | Ackley .................. | 235/472.01 |
| 6,522,441 B1 | * | 2/2003 | Rudeen ...................... | 359/196 |
| 6,832,724 B2 | * | 12/2004 | Yavid et al. ................ | 235/454 |

* cited by examiner

*Primary Examiner*—Michael G. Lee
*Assistant Examiner*—Jamara A. Franklin
(74) *Attorney, Agent, or Firm*—Harden E. Stevens, III; Maginot, Moore & Beck LLP

(57) ABSTRACT

An optical scanner comprises a scanner housing including a scan window, a laser light source, reflected light detector and a Micro-Electro-Mechanical Systems (MEMS) mirror array arranged to produce a scan line pattern. The light from the laser source is adjustably focused by the MEMS mirror array so as to enable auto-focusing of the laser light during the scanning of a bar code.

35 Claims, 12 Drawing Sheets

WEDGE SHAPED SCAN VOLUME

OPTICAL SCANNER HAVING MICRO-ELECTRO-MECHANICAL SYSTEMS MIRROR ARRAY AND ASSOCIATED METHOD

The present invention relates to an optical scanner and more specifically to an optical scanner having enhanced scan volume features.

BACKGROUND OF THE INVENTION

To date the problems of enhanced scan volume and increased readability of bar codes held at different orientations to a scanner have only been addressed by the use of dual aperture scanners.

Commonly assigned U.S. Pat. Nos. 5,229,588, 5,684,289, and 5,886,336 disclose a typical dual aperture optical scanner. The scanning light beams from a laser diode pass through substantially horizontal and vertical apertures to provide more item coverage than a single aperture scanner.

Known multi-aperture optical scanners produce scan patterns with gaps in item coverage. These gaps increase as the item is moved away from an ideal position in the center of the scan volume.

Therefore, it would be desirable to provide an optical scanner which is not only capable of reading a bar code label at different orientations to the scanner, but at different distances to the window.

Scanning bar codes which are located at different distances to the scanner, especially small bar codes such as the new RSS symbology, is extremely difficult. The problem is exacerbated by the characteristic of present day bar code readers that the focal length of the scan light can vary as it traverses the scanner. This is due to the extremely complex network of pattern mirrors utilized in scanners, which can result in different optical path lengths and therefore different focal positions for light passing through the scanner at different times.

The complexity of, especially dual aperture, scanners will be described in order to illustrate another advantage of the present invention, which is the simplicity and corresponding ease of construction of the scanner, which helps mitigate the problems detailed above.

As will be illustrated in more detail below, with reference to FIGS. 1 to 6, present day scanners comprise, a laser assembly, spinner assembly, collection optics, pattern mirrors, detector assembly, electronics, a window and scanner housing which contains all the individual assemblies. In operation, the laser beam intercepts the polygon spinner and is subsequently scanned in a single axis towards a set of pattern mirrors which reflect the individual scan lines out the window and onto a barcode. The laser energy is then reflected off of the barcode and a portion is gathered by the collection optics and focused onto the detector generating a signal to be decoded by the electronics. The positions at which the scan lines exit the window are static, and are contained in a relatively small portion of the hemispherical volume available outside and adjacent to the window (FIG. 6). Consequently, the readability of barcodes is limited to certain positions within that small scan volume

SUMMARY OF THE INVENTION

Thus, it would be desirable to provide an optical scanner which is optically simple. It would also be desirable to produce an optical scanner which can address one or more of the problems detailed above.

In accordance with a first aspect of the present invention there is provided an optical scanner comprising a scanner housing including a scan window, a laser light source, reflected light detector and a Micro-Electro-Mechanical Systems (MEMS) mirror array arranged to produce a scan line pattern.

Preferably the light from the laser source is adjustably focused by the MEMS mirror array.

More preferably the focal length of the MEMS array is adjusted by adjusting a mirror control signal to each of the mirrors in the MEMS array.

In one embodiment the scanner further comprises a resistor ladder, arranged such that the necessary mirror control signal can be provided to each mirror in the mirror array, to alter the focal length of the mirror array, by providing a single array control signal.

Preferably the optical scanner is arranged to produce a scan pattern containing curved scan lines, by control of the focal length and position of the MEMS array.

Preferably the MEMS array is operable to form the curved scan lines into a spiral scan pattern in which the distance from the MEMS array to the focus of each of the lines is alterable.

Most preferably the focal length of the MEMS array can be altered during a scanning process so as to auto-focus the scanner.

In one embodiment the optical scanner further comprises pattern mirrors arranged to direct light from the MEMS mirror array through the scan window so as to produce scan lines.

Most preferably the optical scanner further comprises control circuitry in the scanner housing for obtaining bar code information from electrical signals from the reflected light detector.

In accordance with a second aspect of the present invention there is provided an optical scanner comprising a scanner housing including a scan window, a laser light source, reflected light detector and a Micro-Electro-Mechanical Systems (MEMS) mirror array arranged to produce a scan line pattern, wherein the light from the laser source is adjustably focused by the MEMS mirror array so as to enable auto-focusing of the laser light during the scanning of a bar code.

In accordance with a third aspect of the present invention there is provided an optical scanner comprising a scanner housing including a scan window, a laser light source, reflected light detector and a Micro-Electro-Mechanical Systems (MEMS) mirror array arranged to produce a scan line pattern including curved scan lines.

In accordance with a fourth aspect of the present invention there is provided a method of scanning a bar code utilizing an optical scanner comprising a scanner housing including a scan window, a laser light source, reflected light detector and a Micro-Electro-Mechanical Systems (MEMS) mirror array arranged to produce a scan line pattern, wherein the light from the laser source is adjustably focused by the MEMS mirror array so as to enable auto-focusing of the laser light during the scanning of a bar code, the method comprising allowing a bar code to be located substantially in front of the scan window and adjusting the focal length of the light from the laser light source until the detector detects light reflected from the bar code.

Preferably the focal length of the MEMS array is adjusted by adjusting a mirror control signal to each of the mirrors in the MEMS array.

Most preferably a resistor ladder is arranged such that the necessary mirror control signal is provided to each mirror in the mirror array, to alter the focal length of the mirror array, by providing a single array control signal.

In one embodiment the MEMS array is controlled to produce a scan pattern containing curved scan lines, by control of the focal length and position of the MEMS array.

Most preferably the MEMS array is controlled to form the curved scan lines into a spiral scan pattern in which the distance from the MEMS array to the focus of the lines is alterable.

Preferably bar code information is produced from electrical signals, produced by control circuitry in the scanner housing, from the light reflected from each bar code.

BRIEF DESCRIPTION OF THE DRAWINGS

An embodiment of a prior art dual aperture scanner will now be described, by way of example, with reference to the accompanying drawings, in which.

Figure 7:
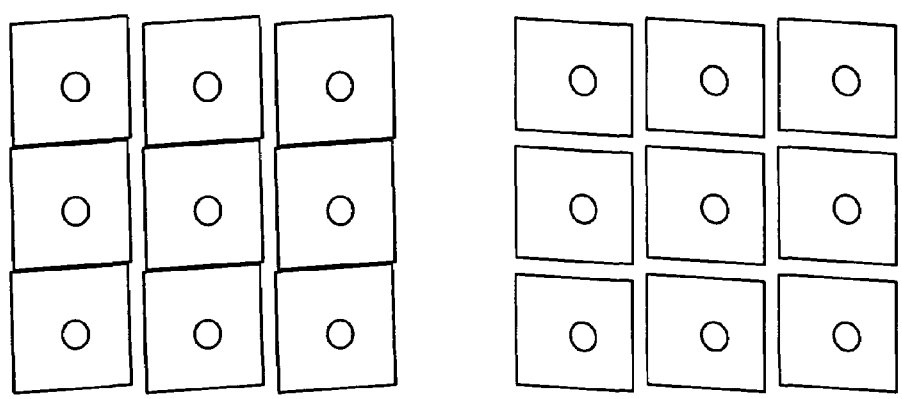
Figure 8:
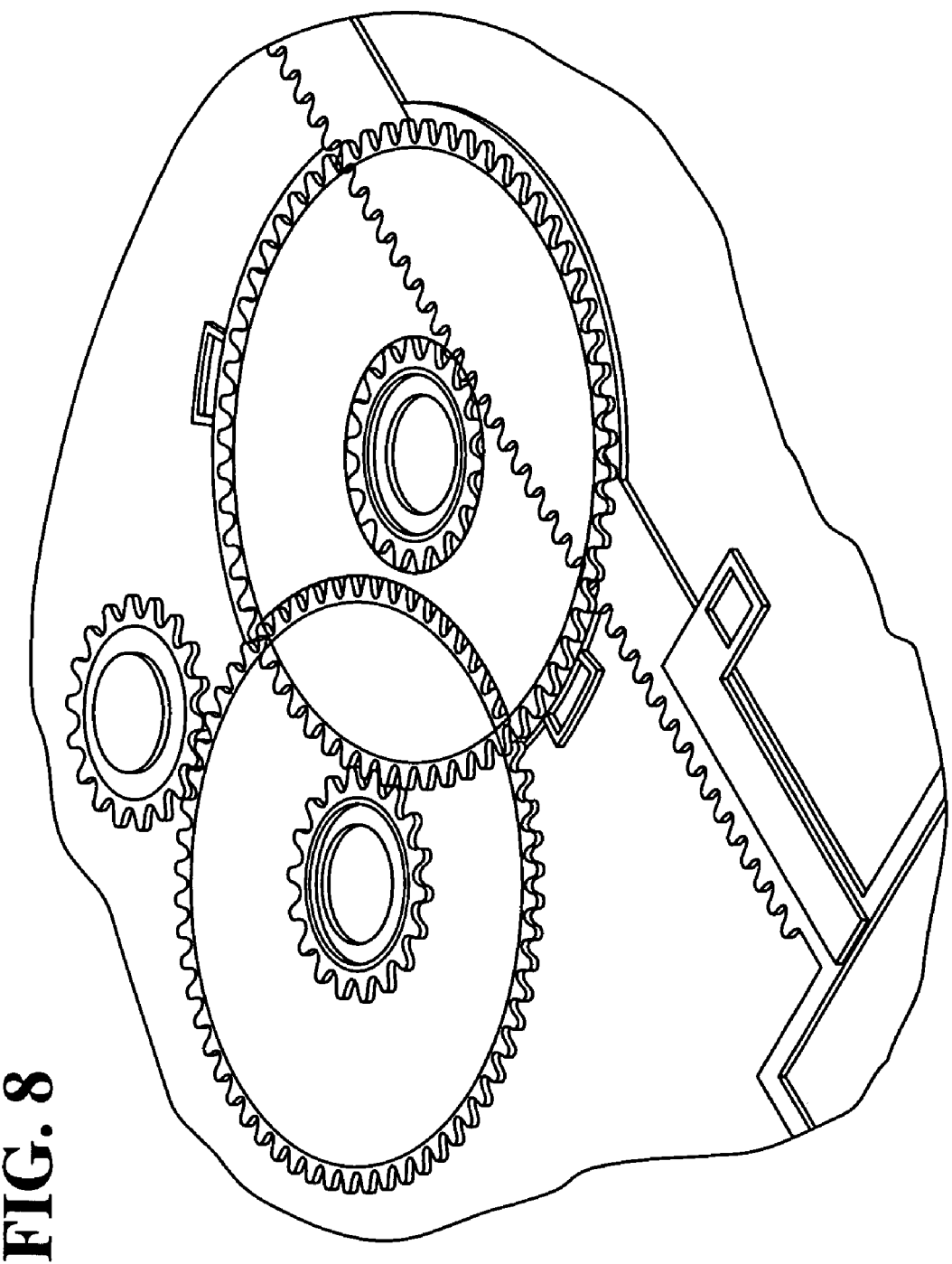
Figure 9:
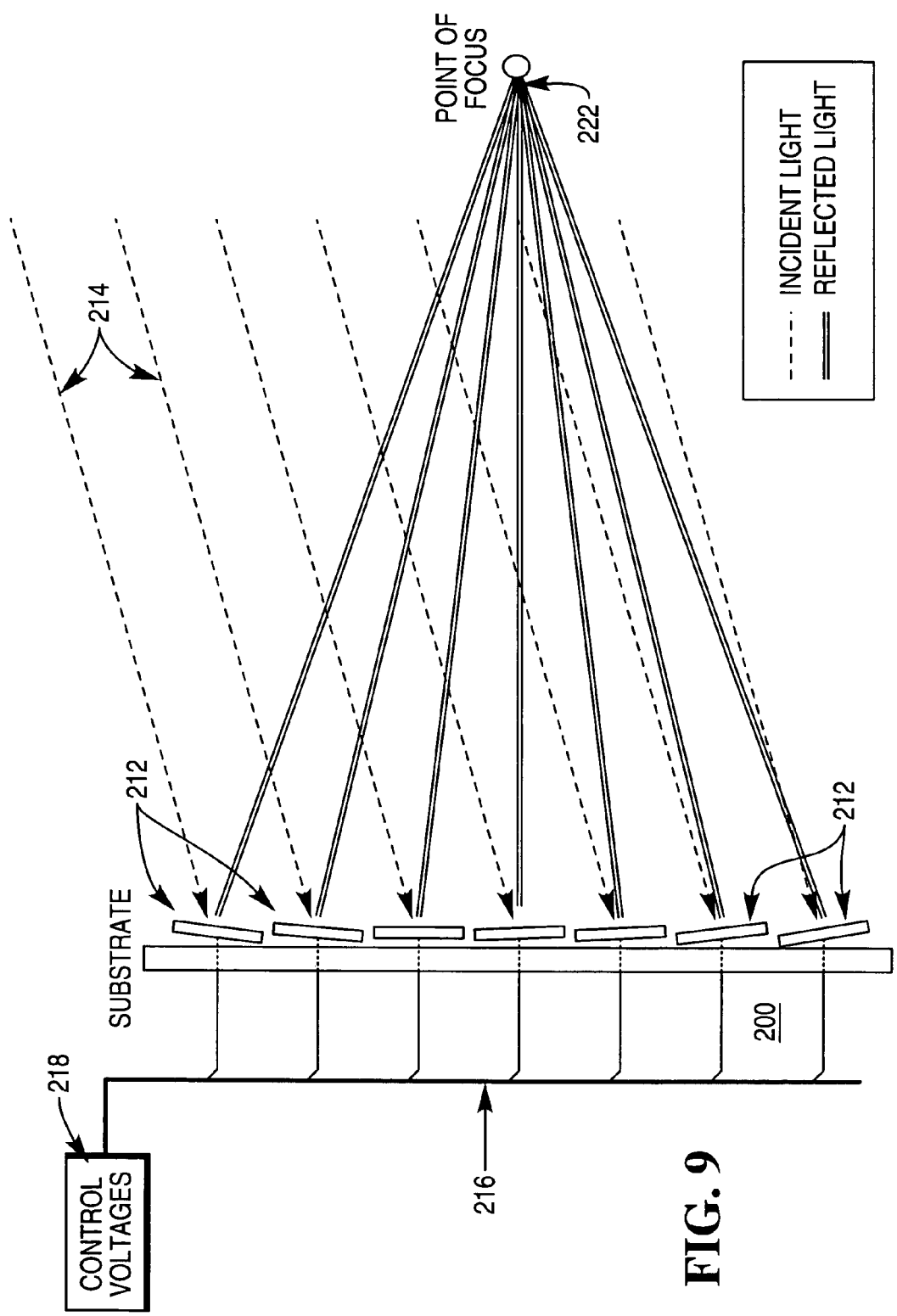
Figure 10:
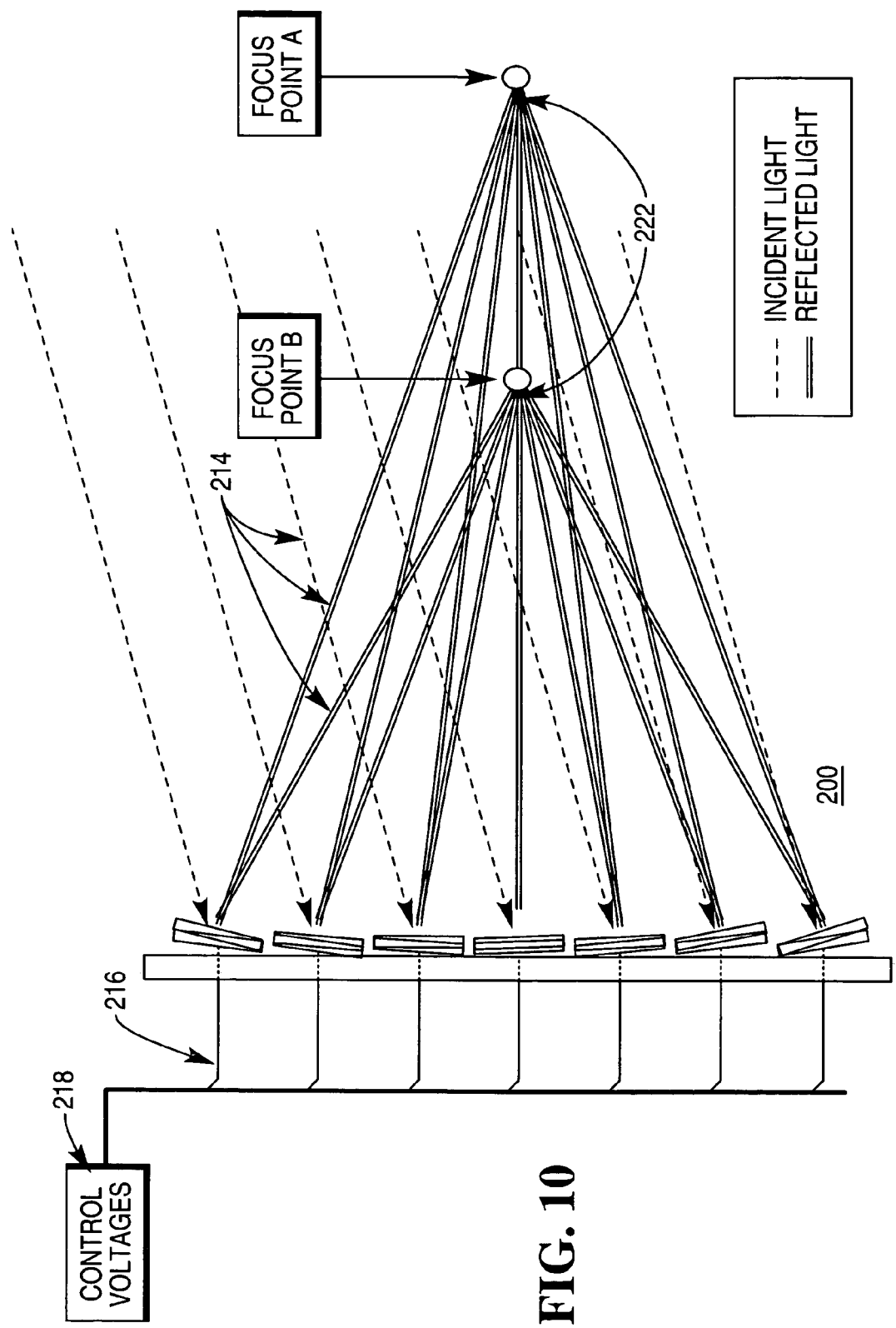
Figure 11:
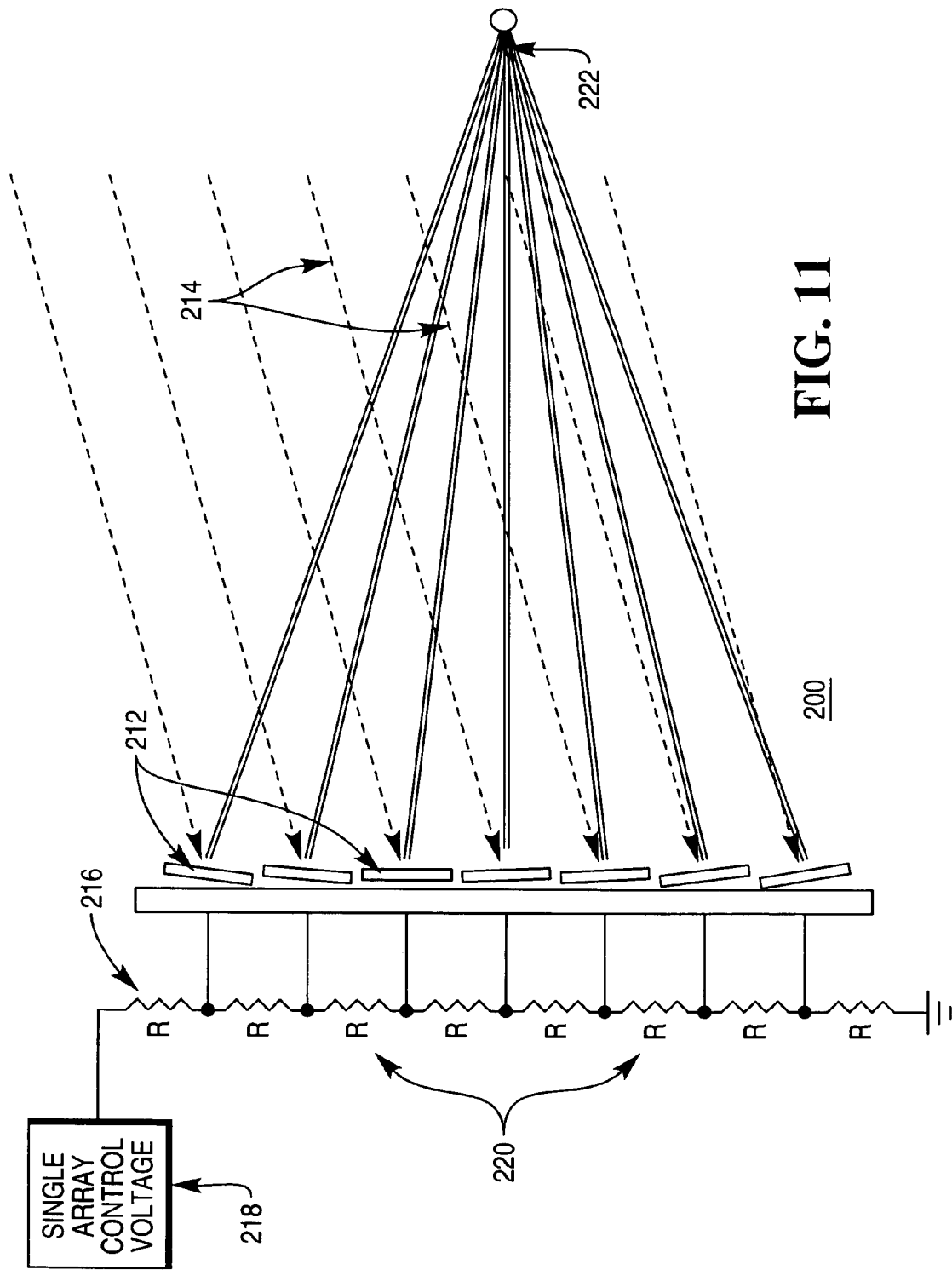
Figure 12:
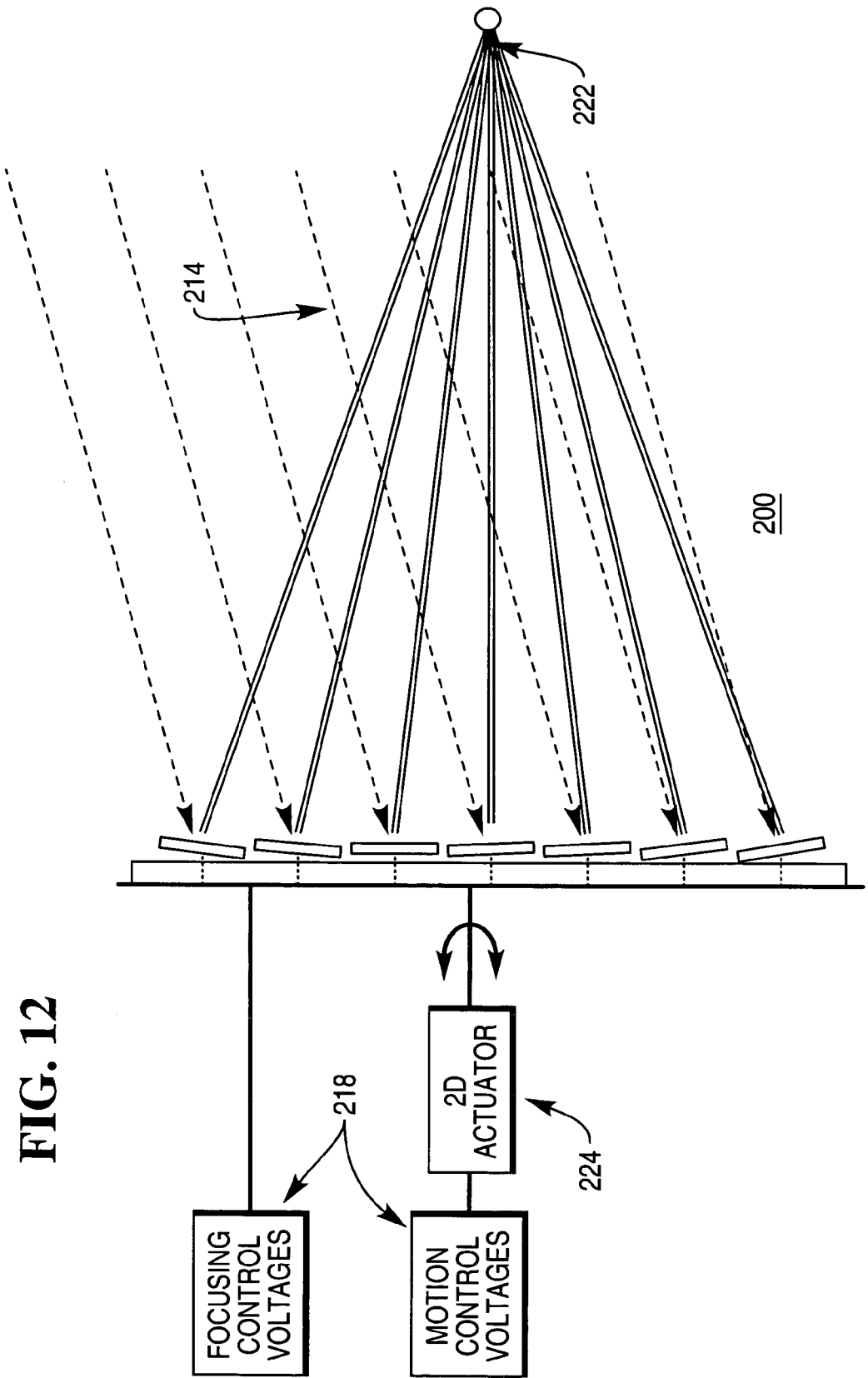
Figure 13:
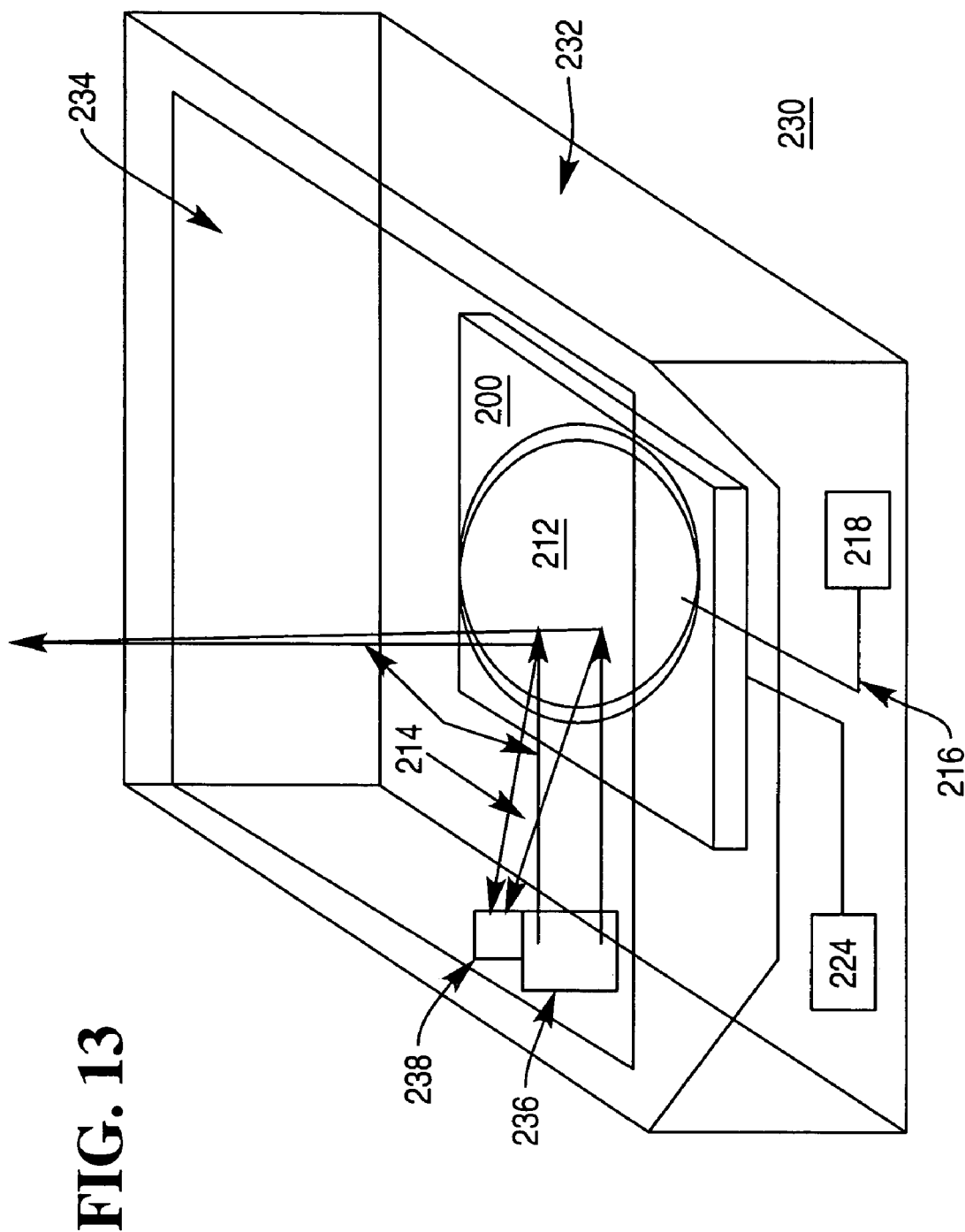

Thereafter embodiments of the present invention will be described, by way of example, with reference to the accompanying drawings, in which:

FIG. 7 is MEMS mirror array for use in an optical scanner in accordance with the present invention;

FIG. 8 is a MEMES gear actuator for positioning a mirror in the MEMS mirror array of FIG. 7;

FIG. 9 is a schematic representation of MEMS mirror array focusing a laser beam;

FIG. 10 is schematic representation of the MEMS mirror array of FIG. 9 arranged to produce variable focusing of the laser beam;

FIG. 11 is a schematic representation of the array of FIGS. 9 & 10 arranged to operate with a single array control signal, which when applied controls the position of all of the mirrors in the array so as to adjustably focus the laser light;

FIG. 12 is a schematic representation of the MEMS mirror array of FIGS. 9 to 11 with a 2 dimensional actuator, arranged to controllably alter the position of the array within the scanner housing; and FIG. 13 is a schematic representation of one embodiment of an optical scanner in accordance with the present invention.

DETAILED DESCRIPTION

Figure 1:
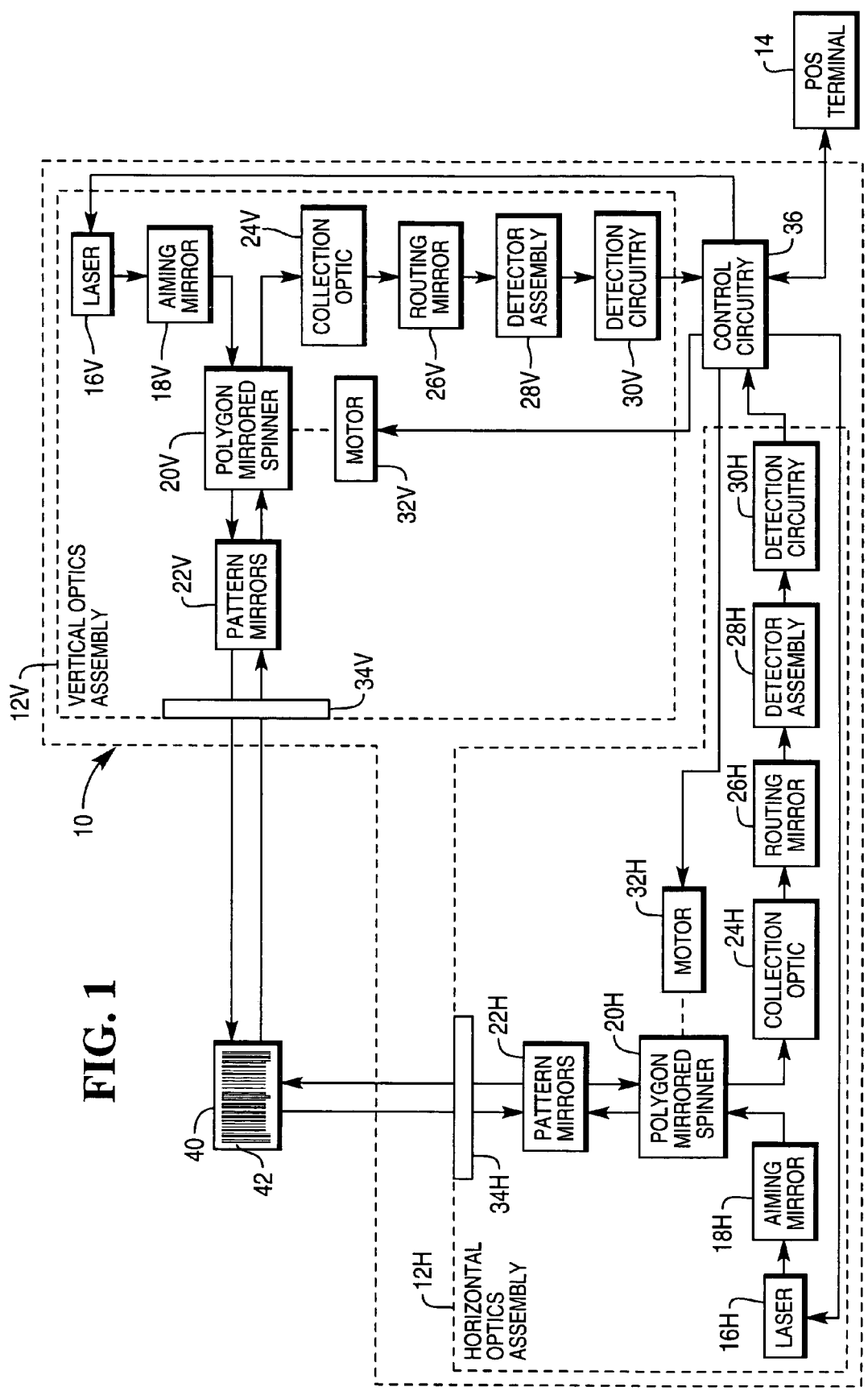
FIG. 1 is a block diagram of the optical scanner having enhanced item side coverage of the present invention.

Referring now to FIG. 1, prior art dual aperture optical scanner 10 includes horizontal optics assembly 12H and vertical optics assembly 12V, and control circuitry 36 for controlling horizontal and vertical optics assemblies 12H and 12V. If one of optics assemblies 12H and 12V fails, scanner 10 retains partial operation.

Horizontal optics assembly 12H projects a scan pattern through substantially horizontal aperture 34H to scan bar codes 42 located on bottom, leading, trailing and checker side surfaces of item 40. It will also scan bar codes 42 on intermediate surfaces including those between the bottom and customer side surfaces.

Horizontal optics assembly 12H includes laser 16H, aiming mirror 18H, polygon mirrored spinner 20H, pattern mirrors 22H, routing mirror 26H, collection optic 24H, detector assembly 28H, detection circuitry 30H, and motor 32H.

Laser 16H includes one or more laser diodes or other suitable laser sources. Laser 16H may include a laser having a wavelength of 650 nm.

Figure 4:
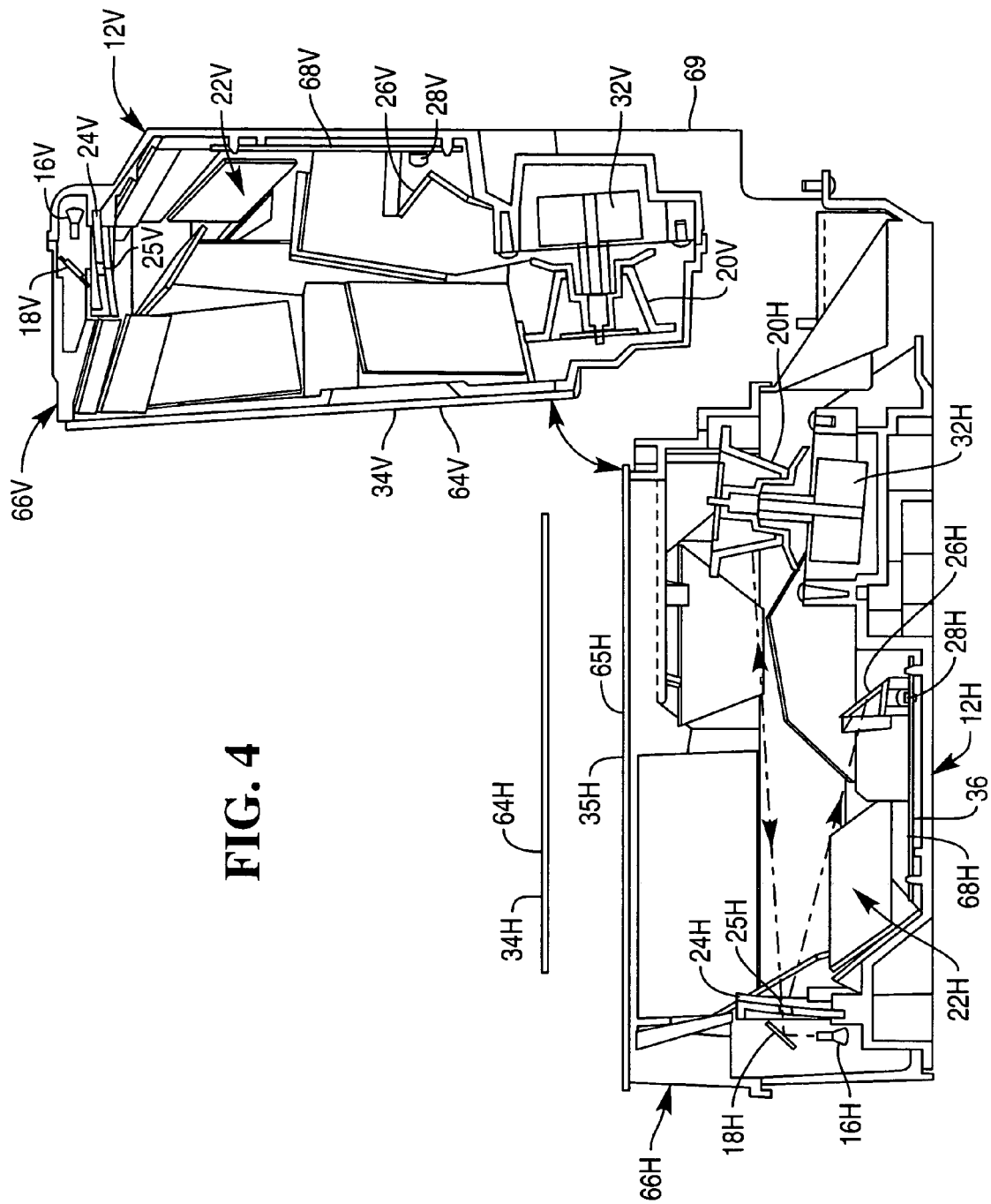
FIG. 4 is a sectional view of the scanner of the present invention along lines 4—4 of FIG. 3.

Aiming mirror 18H aims a laser beam from laser 16H to polygon mirrored spinner 20H. The laser beam passes through a hole 25H in collection optic 24H (FIG. 4).

Polygon mirrored spinner 20H directs the laser beam to pattern mirrors 22H. Polygon mirrored spinner 20H also routes collected light to collection optic 24H. Polygon mirrored spinner 20H preferably includes four facets, but may include other numbers of facets. Facets are grouped into two pairs. Two opposite facets have angles of 74 degrees and 76 degrees from the spinner base. The other pair of opposite facets has angles of 86.5 degrees and 88.5 degrees. Motor 32H rotates polygon mirrored spinner 20H.

Pattern mirrors 22H produce scanning light beams that emanate from substantially horizontal aperture 34H to form a horizontal scan pattern for reading bar code 42 on item 40. Pattern mirrors 22H also collect light reflected from item 40 and direct it to polygon mirrored spinner 20H.

Collection optic 24H routes collected light from polygon mirrored spinner 20H to routing mirror 26H.

Routing mirror 26H routes the collected light to detector assembly 28H.

Detector assembly 28H focuses, optically filters, and converts collected light into electrical signals.

Detection circuitry 30H obtains bar code information from the electrical signals. Detection circuitry 30H includes circuitry for digitizing bar code information.

Vertical optics assembly 12V projects a scan pattern from substantially vertical aperture 34V and primarily scans bar codes located on a customer side and top side of an item. Like horizontal optics assembly 12H, vertical optics assembly 12V scans the leading and trailing sides, as well as intermediate surfaces including those between the bottom and customer side surfaces. However, for simplicity the substantially similar vertical assembly will not be described in detail herein.

Control circuitry 36 processes the electrical signals from detector assemblies 28H and assembly 28V to obtain bar code information. Control circuitry 36 passes the bar code information to POS terminal 14.

Control circuitry 36 controls operation of lasers 16H and 16V and motors 32H and 32V. Control circuitry 36 may remove power from lasers 16H and 16V and motors 32H and 32V to increase their longevity.

POS terminal 14 receives transaction data, for example, in the form of SKU numbers from scanner 10 and completes a transaction by finding price data for the SKU numbers in a price-lookup data file.

Figure 2:
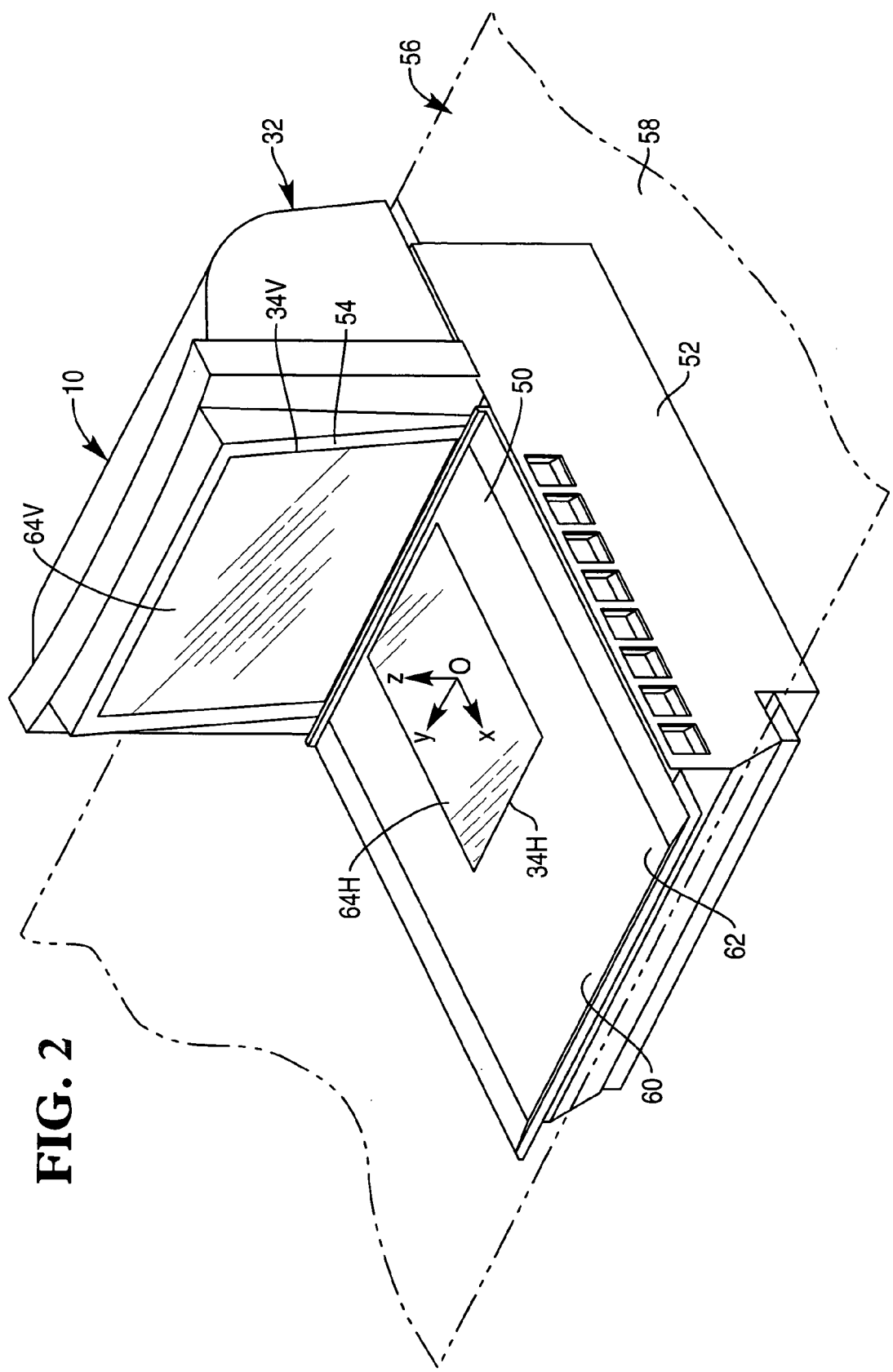
FIG. 2 is an exterior perspective view of the scanner of the present invention, including a reference coordinate system for the group of pattern mirrors within the scanner of the present invention.

Turning now to FIG. 2, scanner 10 is shown in perspective.

Scanner 10 as illustrated includes an integral scale 60. Scale 60 includes weigh plate 62, which includes substantially horizontal surface 50 and substantially horizontal aperture 34H. Horizontal window 64H is located within horizontal aperture 34H.

Substantially vertical aperture 34V is located within substantially vertical surface 54. Substantially vertical window 64V is located within substantially vertical aperture 34V.

Scanner 10 includes housing 52. Preferably, housing 52 may be easily adapted to fit in a typical checkout counter 56. It is envisioned that substantially horizontal surface 50 be made substantially flush with top surface 58 of counter 56. Scanner 10 is installed within checkout counter 56 so that substantially vertical aperture 34V faces a store employee or other operator.

An illustrated reference X-Y-Z coordinate system determines orientations of pattern mirrors 22H and 22V within scanner 10 of the present invention. Origin O is defined such that:

X=0 is on the centerline of the scanner;

Z=0 is on the centerline of the scanner; and

Y=0 is on the substantially horizontal surface 50.

Figure 3:
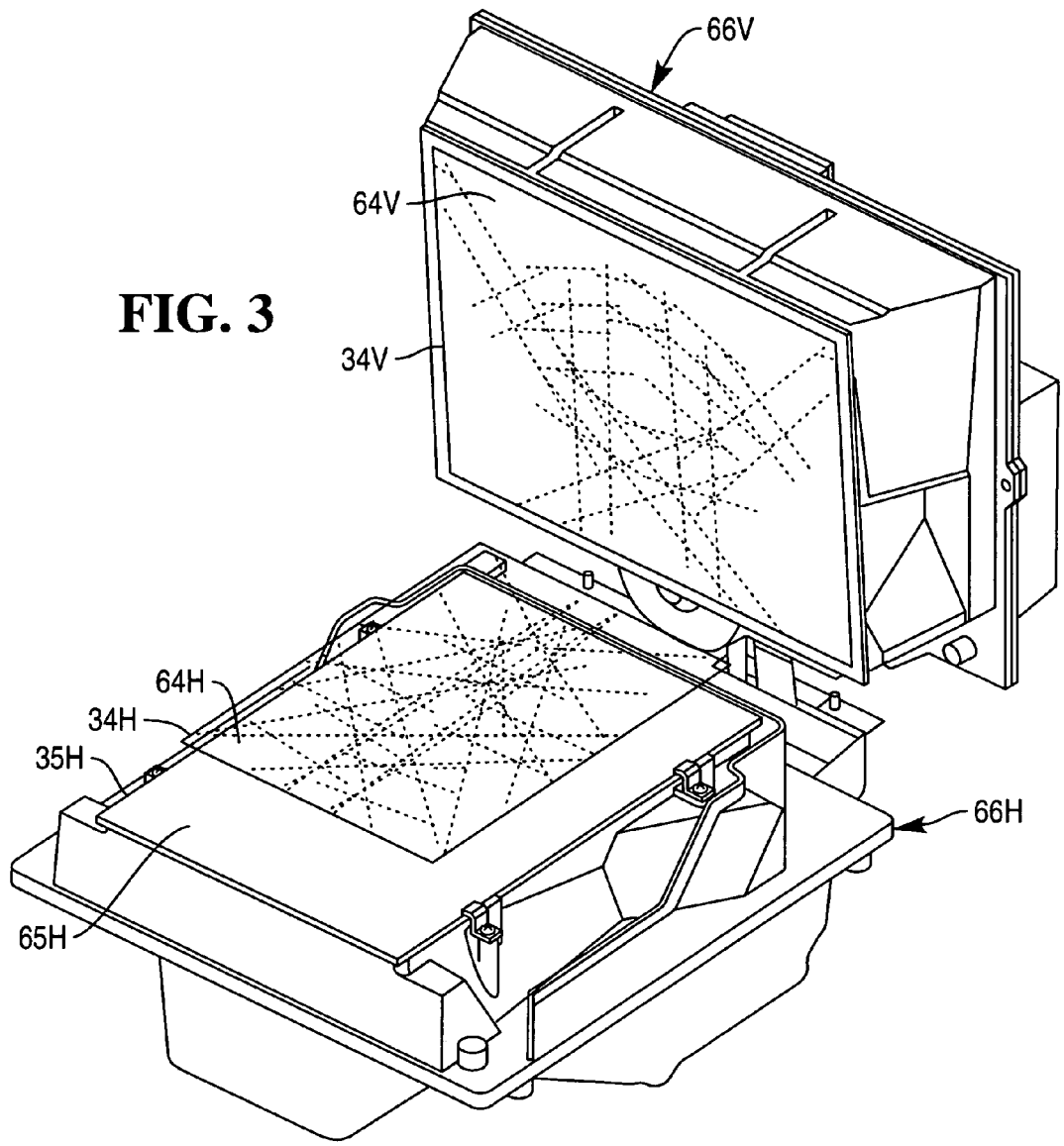
FIG. 3 is an interior perspective view of the scanner of the present invention, showing horizontal and vertical scanner portions.

Referring now to FIGS. 3–4, horizontal optics assembly 12H and vertical optics assembly 12V are shown in their positions within housing 52.

Horizontal optics assembly 12H and vertical optics assembly 12V each have nearly all of the optical components of a functional bar code scanner. Horizontal optics assembly 12H and vertical optics assembly 12V each have their own housings 66H and 66V and printed circuit boards 68H and 68V. In the illustrated example, control circuitry 36 is located in horizontal optics assembly 12H and signals vertical optics assembly 12V are brought to control circuitry 36 via cables 69.

Horizontal optics assembly 12H includes horizontal aperture 35H and window 65H. Scale weigh plate 62 with horizontal aperture 34H and window 64H are located above window 65H.

Horizontal optics assembly 12H will scan all label orientations on the bottom and checker sides of item 40, as well as certain orientations on the leading and trailing sides.

Optical pathing between laser 16H and polygon mirrored spinner 20H avoids contacting pattern mirrors 22H along the way. Laser 16H is located on a checker side of horizontal optics assembly 12H and polygon mirrored spinner 20H is located on the opposite side. Collection optic 24H is located adjacent laser 16H. The laser beam from laser 16H passes through hole 25H in collection optic 24H. Detector assembly 28H is located between collection optic 24H and polygon mirrored spinner 20H.

Spinners 20H and 20V are located where they are in order to generate suitable scan lines. In optics assembly 12H, the generation of the front vertical lines requires arcs of light reflected from a spinner 20H on the back side of the optical cavity.

Substantially vertical aperture 34V is oriented at an acute angle T of about 86 degrees from substantially horizontal aperture 34H. Other angular configurations, acute and obtuse, are also anticipated by the present invention.

Operationally, lasers 16H and 16V emit laser beams onto aiming mirrors 18H and 18V, which reflect the laser beams through holes 25H and 25V in collection optics 24H and 24V and then onto mirrored polygon spinners 20H and 20V. The polygon facets further reflect the laser beams up or down (for horizontal assembly 12H) or forward or rearward (for vertical assembly 12V), depending upon the facet struck. As the facets rotate, the laser beams are scanned in a shallow arc and reflected onto pattern mirrors 22H and 22V. In some cases, primary pattern mirrors reflect the laser beams through apertures 34H and 34V onto surfaces of item 40. In other cases, the primary pattern mirrors reflect the laser beams onto secondary mirrors that reflect the laser beams through apertures 34H and 34V onto surfaces of item 40.

As item 40 is moved through the scan zone (above horizontal aperture 34H and in front of vertical aperture 34V), scan lines generated by the laser beams from horizontal and vertical apertures 34H and 34V strike bar code label 42, no matter where it is located on item 42. A scan line will pass through all or part of bar code label 40.

Item 42 scatters light back along the path of the incident laser light. The scattered light passes through horizontal and vertical apertures 34H and 34V, onto the secondary mirrors (if present), onto the primary mirrors and onto the polygon facets. The rotating facets reflect the scattered light onto collection optics 24H and 24V. Collection optics 24H and 24V focus the scattered light onto detector assemblies 28H and 28V by way of routing mirrors 26H and 26V. Detector assemblies 28H and 28V convert the scattered light into electrical signals for analog processing by pre-video circuitries 30H and 30V and digital processing by control circuitry 36.

Figure 5:
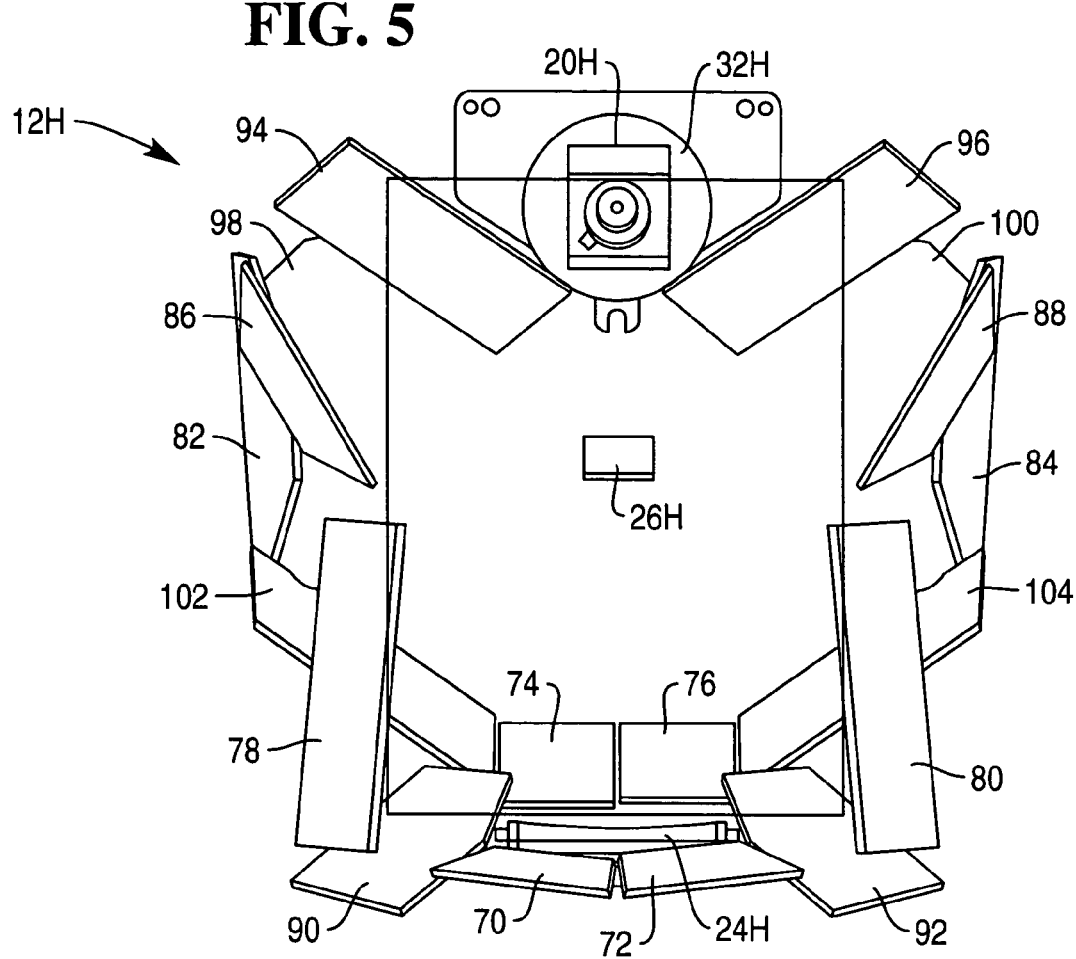
FIG. 5 is a top view of a horizontal mirror basket within a horizontal optics assembly.
Figure 6:
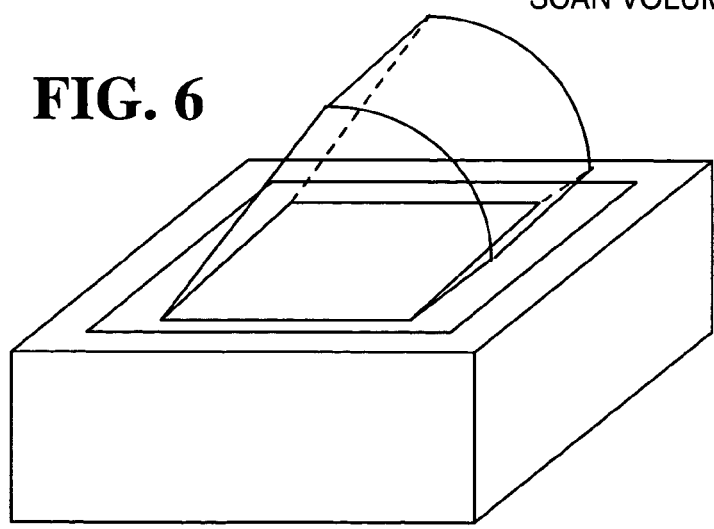
FIG. 6 is a schematic illustration of the scan pattern from the horizontal window of a prior art dual aperture scanner.

Referring now to FIG. 5, pattern mirrors 22H are shown in detail. Horizontal pattern mirrors 22H include primary pattern mirrors and secondary pattern mirrors. The primary pattern mirrors receive a laser beam directly from spinner 20H. The secondary mirrors receive the laser beam from some of the primary pattern mirrors.

The term "front" as applied to mirrors means operator or checker side. The term "rear" as applied to mirrors means the side opposite to the operator or checker side. As illustrated, horizontal pattern mirrors 22H exhibit substantially bilateral symmetry between the leading and trailing sides of horizontal optics assembly 12H.

The primary pattern mirrors include left rear diagonal mirror 86, right rear diagonal mirror 88, left front vertical mirror 78, right front vertical mirror 80, left horizontal mirror 82, right horizontal mirror 84, left front picket mirror 70, right front picket mirror 72, left front diagonal mirror 102, right front diagonal mirror 104, left front bottom picket mirror 74, and right front bottom picket 76.

The secondary pattern mirrors include left rear diagonal mirror 94, right rear diagonal mirror 96, left front vertical mirror 90, right front vertical mirror 92, left horizontal mirror 98, and right horizontal mirror 100.

With reference to FIGS. 7 to 12, we will now turn to a detailed explanation of scanners in accordance with the present invention.

The heart of this invention is an array of Micro-Electro-Mechanical Systems, or MEMS. MEMS is a nano-fabrication technology which provides the capability of merging mechanical functions like gears, valves, and mirrors with electronic actuator circuits on an extremely small scale (FIGS. 7 & 8). MEMS are commonly used in DLP computer projectors, using tiny mirrors to block or reflect light for thousands of individual pixels.

A coordinated array 200 of MEMS mirrors 212 is utilized to focus a laser beam 214 or other light source (See FIG. 9). By applying a defined control voltage 216 to each mirror element 212, it can be positioned to reflect light towards a specific spot (A or B, FIG. 10). If all mirrors direct light to the same spot, then the resulting beam of light will be "in focus" at that spot. By changing the positions of the mirrors in a coordinated fashion, the focal distance can be changed. In one embodiment, a finished assembly will consist of a round pattern of mirror elements, arranged as a set of concentric circles. Such an array would act very similarly to a conventional optical variable-focus lens. FIG. 7 shows a rectangular MEMS mirror array provided on a FLAT silicon wafer and therefore requiring very little space.

Controlling the position of each mirror element in the array is done with a set of electrical signals 216 generated by a computerized system.

In the electrical "drive" circuitry 218 of FIG. 11 only a single control signal is used to set the focal length of the entire array 200. A simple resistor ladder 220 is utilized to provide the necessary voltage to each mirror element 212 from a single input signal. One merely needs to fine-tune the values of the resistors to synchronize the deflections of the individual MEMS mirrors. After the system is calibrated, the mirror acts like an optical lens with a moving element. The result is a reflected beam of light 222 with extremely accurate focus at a wide range of focal lengths.

Once we have the above array 200 of mirror elements 212 which can be easily and accurately focused, we can change that focus in "real-time" and at high speeds. This is the second step in designing a MEMS scanner device. As the beam travels through space to create a "scan pattern," the mirrors can be dynamically focused to maintain a very high resolution for reading small barcodes, etc.

The final step in applying this concept to a scanner is to mount the entire MEMS assembly onto a 2D actuator 224 (FIG. 12), which can move the beam in a pre-defined pattern. One must remember that the entire MEMS assembly is tiny and light—perhaps a few millimeters square. The 2D actuator can therefore be, for example, a pair of very small servo motors or even another set of MEMS devices. By using a second set of control voltages to move the array mechanism, it is possible to create virtually any scan pattern—the current set of intersecting lines, a concentric set of circles, or even a spiral in which the focal length increases or decreases during the scan process, etc. The light source 236 may need to be rigidly attached to the actuator 224 so as to move with the MEMS array to maintain its focus This ability substantially increases the read rate of barcodes despite their decreasing feature size. As the scan pattern gets bigger, though, the focal distance of the beam will vary substantially. This is where the initial concept of the dynamically focused mirror array becomes critical.

In addition, it is feasible to scan a 3D volume, instead of just creating a 2D pattern of lines. By repeating the scan pattern (e.g. a spiral) at various focal distances, objects/barcodes could potentially be detected at much larger distances without sacrificing the ability to read objects close to the scanner. In practice, this "auto-focusing" capability requires a sequence of scans, each one with the mirror array set for an increasing focal length. Given the speed of modern computing and MEMS technologies, is imperceptible to the operator or customer.

FIG. 13 illustrates an optical scanner 230 comprising a scanner housing 232 including a scan window 234. The scanner housing 232 is partially cut away to allow a view of the inside of the housing. The scanner further includes a laser light source 236 and a reflected light detector 238 for detecting light reflected from a bar code 240 located outside the housing 232. Finally the scanner includes a Micro-Electro-Mechanical Systems (MEMS) mirror array 242 arranged to produce a scan line pattern outside of the scan window 234. The light from the laser source 236 is adjustably focused by the MEMS mirror array 242. The focal length of the MEMS array is adjusted by adjusting a mirror control signal to each of the mirrors in the MEMS array, as described above.

In one embodiment the optical scanner can further comprising pattern mirrors, such as those described in relation to the prior art scanner of FIGS. 1 to 6, arranged to direct light from the MEMS mirror array through the scan window so as to produce scan lines. Alternatively, as in FIG. 13, the light reflected and focused by the MEMS array can be directed out of the scan window without the use of additional pattern mirrors.

The optical scanner further comprises control circuitry 244 in the scanner housing 232 for obtaining bar code information from electrical signals from the reflected light detector 238.

When in use the scanner described above can be utilized to scan a bar code located substantially in front of the scan window 234, by adjusting the focal length of the light from the laser source until the detector 238 detects light reflected from the bar code.

A scanner in accordance with the present invention will provide a simple, fast way to dynamically focus a beam of light (or laser beam) so as to scan a bar code. Furthermore it allows a scanner to compensate in real-time for varying beam distances, which occur naturally in a laser scan pattern. Hence, it improves readability of small barcodes like the RSS symbology and enables a scanner to become essentially "auto-focusing" and read at a wider range of distances.

Due to the small size of MEMS devices a significantly smaller scan engine can be produced. Also, as a complex arrangement of pattern mirrors is not necessary the scanner can be manufactured at substantially reduces cost compared to current scanners which utilize spinner motors and a large numbers of mirrors. Finally, the present scanner provides many unique scan patterns with tighter line spacing (density).

The foregoing description of the preferred embodiments of the invention has been presented for the purposes of illustration and description. It is not intended to be exhaustive or to limit the invention to the precise form disclosed. Many modifications and variations are possible in light of the above teaching within the spirit and scope of the invention as claimed

What is claimed:

1. An optical scanner comprising a scanner housing including a scan window, a laser light source, reflected light detector and a Micro-Electro-Mechanical Systems (MEMS) mirror array arranged to produce a scan line pattern, wherein the light from the laser light source is adjustably focused by the MEMS mirror array so as to enable auto-focusing of the laser light during the scanning of a bar code.

2. The optical scanner of claim 1, wherein the focal length of the MEMS array is adjusted by adjusting a mirror control signal to each of the mirrors in the MEMS array.

3. The optical scanner of claim 2, further comprising a resistor ladder, arranged such that the necessary mirror control signal is provided to each mirror in the mirror array, to alter the focal length of the mirror array, by providing a single array control signal.

4. The optical scanner of claim 1, arranged to produce a scan pattern containing curved scan lines, by control of the focal length and position of the MEMS array.

5. The optical scanner of claim 4, wherein the MEMS array is operable to form the curved scan lines into a spiral scan pattern in which the distance from the MEMS array to the focus of the lines is alterable.

6. The optical scanner of claim 1, further comprising a 2-dimensional actuator, on which the MEMS mirror array is mounted, which is arranged to move the MEMS mirror array and thus create a plurality of different scan patterns.

7. The optical scanner of claim 6, wherein the actuator is formed from a pair of servo-motors.

8. The optical scanner of claim 6, wherein the actuator is formed from additional MEMS motor devices.

9. The optical scanner of claim 1, further comprising pattern mirrors arranged to direct light from the MEMS mirror array through the scan window so as to produce scan lines.

10. The optical scanner of claim 1, further comprising control circuitry in the scanner housing for obtaining bar code information from electrical signals from the reflected light detector.

11. A method of scanning a bar code utilizing an optical scanner comprising a scanner housing including a scan window, a laser light source, reflected light detector and a Micro-Electro-Mechanical Systems (MEMS) mirror array arranged to produce a scan line pattern, wherein the light from the laser source is adjustably focused by the MEMS mirror array so as to enable auto-focusing of the laser light during the scanning of a bar code,
the method comprising allowing a bar code to be located substantially in front of the scan window and adjusting the focal length of the light from the laser source until the detector detects light reflected from the bar code.

12. The method of claim 11, wherein the focal length of the MEMS array is adjusted by adjusting a mirror control signal to each of the mirrors in the MEMS array.

13. The method of claim 12, wherein a resistor ladder is arranged such that the necessary mirror control signal is provided to each mirror in the mirror array, to alter the focal length of the mirror array, by providing a single array control signal.

14. The method of claim 11, wherein the MEMS array is controlled to produce a scan pattern containing curved scan lines, by control of the focal length and position of the MEMS array.

15. The method of claim 14, wherein the MEMS array is controlled to form the curved scan lines into a spiral scan pattern in which the distance from the MEMS array to the focus of the lines is alterable.

16. The method of claim 11, further comprising locating the MEMS mirror array on a 2-dimensional actuator and moving the MEMS mirror array so as to create a plurality of different scan patterns.

17. The method of claim 16, wherein the actuator is formed from a pair of servo-motors.

18. The method of claim 11, wherein the actuator is formed from additional MEMS motor devices.

19. The method of claim 11, wherein bar code information is produced from electrical signals, produced by control circuitry in the scanner housing, from the light reflected from each bar code.

20. A method of scanning a bar code, comprising:
generating light with a light source;
reflecting light generated by the light source with a Micro-Electro-Mechanical Systems (MEMS) mirror array;
moving the MEMS mirror array during the reflecting step to generate a repeating scan pattern of light;
altering focal length of light reflected by the MEMS mirror array during the moving step;
positioning an object bearing a bar code into light reflected by the MEMS mirror array during the altering and moving steps so that light is reflected off the object bearing the bar code; and
generating bar code information in response receipt of light reflected off the object bearing the bar code.

21. The method of claim 20, wherein the altering step includes changing the arrangement of the MEMS mirror array between (i) a first configuration in which light reflected by the MEMS mirror array possesses a first focal length, and (ii) a second configuration in which light reflected by the MEMS mirror array possesses a second focal length which is different from the first focal length.

22. The method of claim 21, wherein:
the MEMS mirror array includes a plurality of mirror elements that are configurable between the first configuration and the second configuration, and
the altering step includes (i) providing a control signal to each of the plurality of mirror elements, and (ii) moving the plurality of mirror elements from the first configuration to the second configuration in response to receipt of the control signal.

23. The method of claim 22, wherein the altering step further includes generating the control signal with a resistor ladder circuit.

24. The method of claim 20, wherein the bar code generating step includes:
receiving light reflected off the object bearing the bar code with a reflected light detector and generating electrical signals in response thereto; and
generating bar code information based on the electrical signals.

25. An optical scanner, comprising:
a light source operable to generate light;
a Micro-Electro-Mechanical Systems (MEMS) mirror array positioned to reflect light generated by said light source, said MEMS mirror array being movable between (i) a first configuration in which light reflected by said MEMS mirror array possesses a first focal length, and (ii) a second configuration in which light reflected by said MEMS mirror array possesses a second focal length which is different from said first focal length;
an actuator coupled to said MEMS mirror array and operable to move said MEMS mirror array while said MEMS mirror array is reflecting light generated by said light source so that a repeating scan pattern of light is produced;
a reflected light detector (i) positioned to receive light reflected off an object bearing a bar code that is located in a path of light being reflected off said MEMS mirror array, and (ii) operable to generate electrical signals in response to receipt of light being reflected off the object bearing the bar code; and
circuitry operable to (i) receive said electrical signals generated by said reflected light detector, and (ii) generate bar code information in response thereto.

26. The optical scanner of claim 25, further comprising a controller operable to generate control signals, wherein:
said MEMS mirror array includes a plurality of mirror elements that are configurable between said first configuration and said second configuration, and
said plurality of mirror elements move between said first configuration and said second configuration in response to generation of said control signals.

27. The optical scanner of claim 26, wherein said controller includes a resistor ladder circuit.

28. The optical scanner of claim 25, wherein said actuator includes a servo motor apparatus.

29. A method of scanning a bar code, comprising:
generating light with a light source;
reflecting light generated by the light source with a Micro-Electro-Mechanical Systems (MEMS) mirror array;
moving the MEMS mirror array during the reflecting step to generate a repeating scan pattern of light; and
altering focal length of light reflected by the MEMS mirror array.

30. The method of claim 29, further comprising generating bar code information in response receipt of light reflected off an object bearing a bar code that is located in a path of light being reflected off the MEMS mirror array.

31. The method of claim 29, wherein the altering step includes changing the arrangement of the MEMS mirror array between (i) a first configuration in which light reflected by the MEMS mirror array possesses a first focal length, and (ii) a second configuration in which light reflected by the MEMS mirror array possesses a second focal length which is different from the first focal length.

32. The method of claim 29, wherein:
the MEMS mirror array includes a plurality of mirror elements, and
the altering step includes (i) generating a control signal, and (ii) moving the plurality of mirror elements in response to generation of the control signal.

33. The method of claim 32, wherein the altering step further includes generating the control signal with a resistor ladder circuit.

34. The method of claim 29, further comprising:
receiving light reflected off an object bearing a bar code with a reflected light detector and generating electrical signals in response thereto; and
generating bar code information based on the electrical signals.

35. The method of claim 29, wherein said altering step is performed during said moving step.

* * * * *